United States Patent [19]

Marcum

[11] 4,010,469
[45] Mar. 1, 1977

[54] INTERFERENCE SUPPRESSION
[75] Inventor: Jess I. Marcum, Santa Monica, Calif.
[73] Assignee: The Rand Corporation, Santa Monica, Calif.
[22] Filed: June 20, 1951
[21] Appl. No.: 232,615
[52] U.S. Cl. .............................. 343/18 E; 343/5 R; 343/11 R; 343/13 R; 343/100 LE
[51] Int. Cl.² ......................... G01S 7/36; H04B 7/00
[58] Field of Search ................ 343/5, 6, 11, 13, 18, 343/112, 5 R, 11 R, 13 R, 100 LE, 18 E

[56] References Cited
UNITED STATES PATENTS

| | | | |
|---|---|---|---|
| 2,279,031 | 4/1942 | Cockerell et al. | 343/107 |
| 2,446,244 | 8/1948 | Richmond | 343/13 |
| 2,494,339 | 1/1950 | Keister | 343/13 |
| 2,502,454 | 4/1950 | Grieg | 343/13 |

Primary Examiner—Maynard R. Wilbur
Attorney, Agent, or Firm—Fulwider, Patton, Rieber, Lee & Utecht

EXEMPLARY CLAIM

4. A system for reducing the effect of unwanted signals directed toward a receiver intended to receive reflected pulsed signals through an antenna having a radiation pattern that includes a desired main lobe and undesired additional areas, which includes: means for receiving said reflected pulsed signals; other means for receiving said unwanted signals; means for combining the outputs of both said receiving means in opposition; means periodically adjusting the output of one of said receiving means relative to the other to provide a minimum output of said combining means; and means holding constant the adjustment of said adjusting means between said periodic adjustments.

4 Claims, 2 Drawing Figures

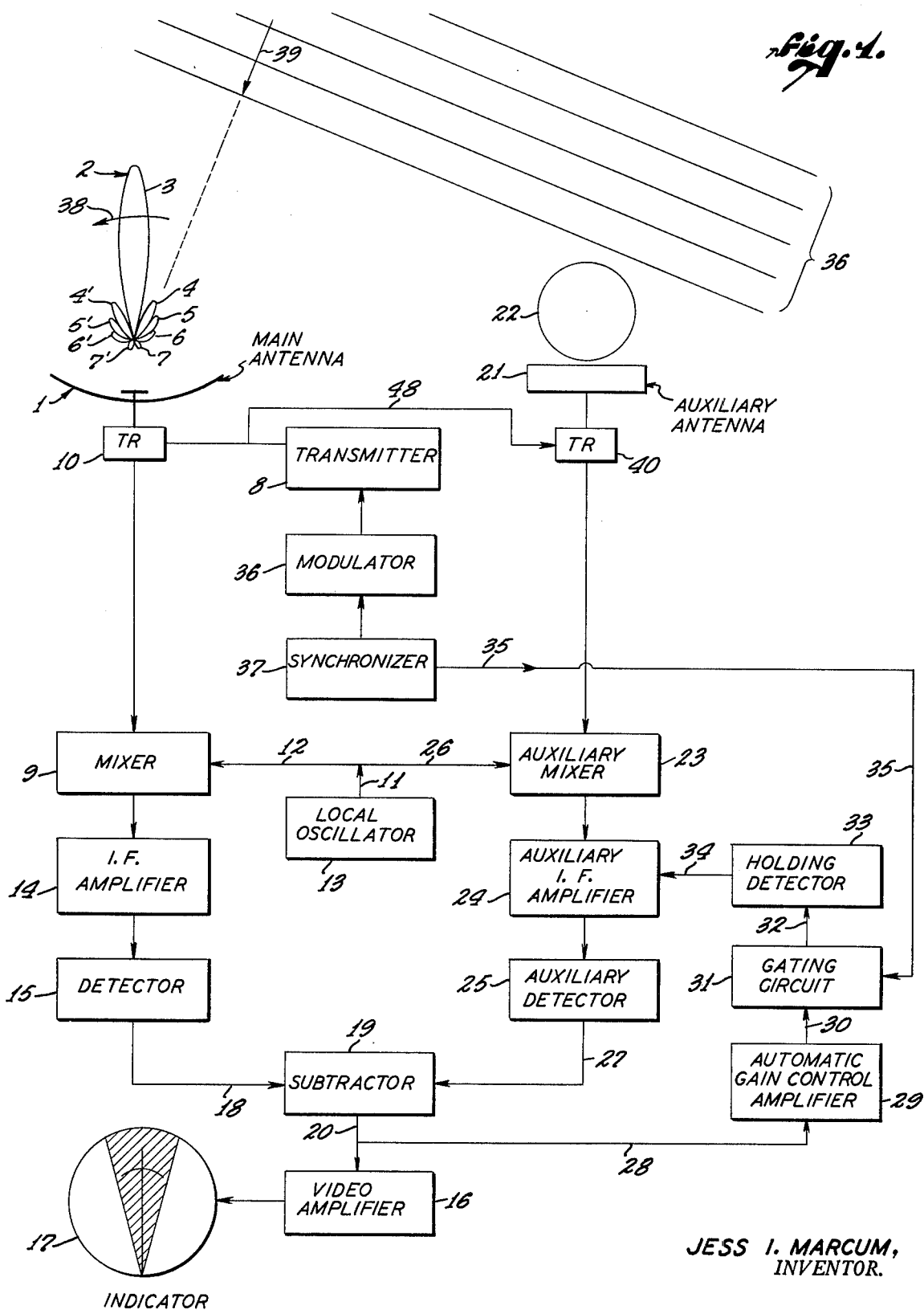

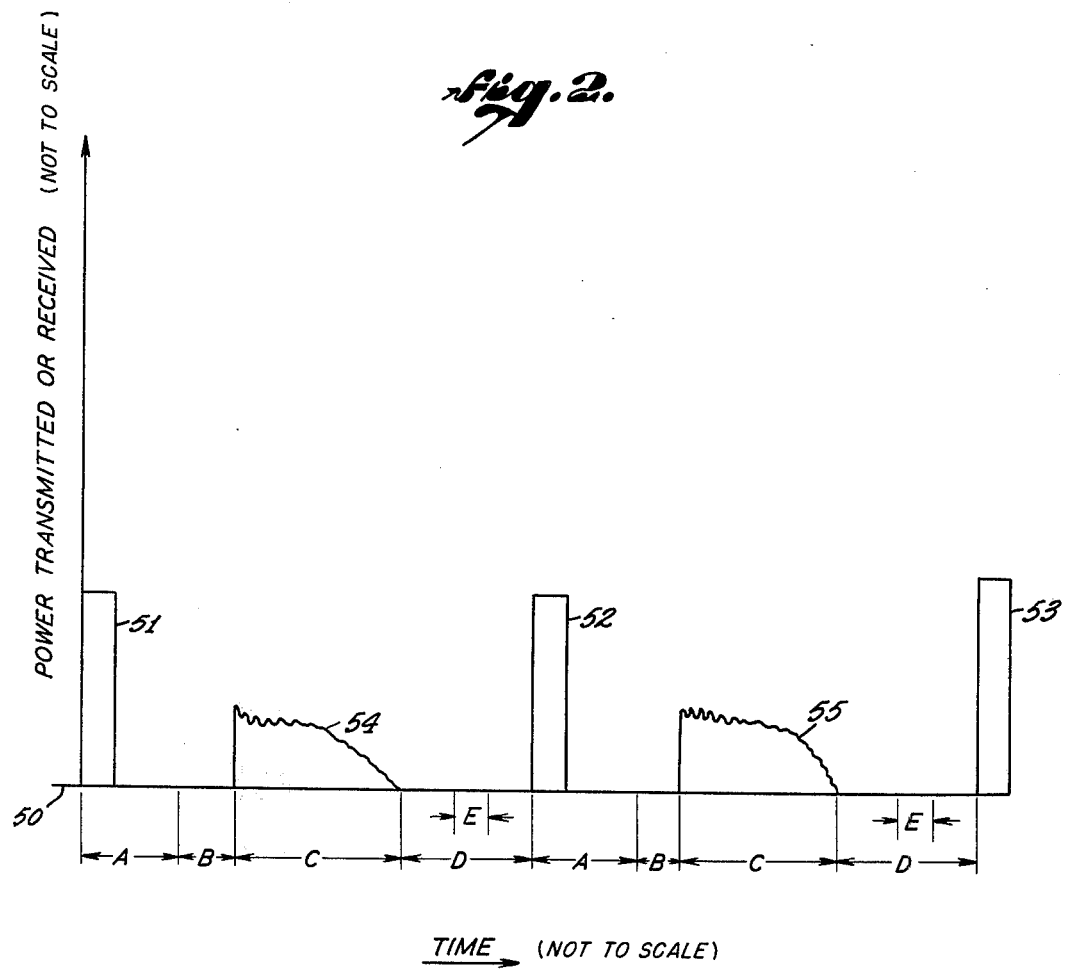

INTERFERENCE SUPPRESSION

This invention relates to a radar anti-jamming device and method, and particularly to a pulse-modulated radar system, using a directional beam antenna with side lobes, which eliminates unwanted signals picked up by the side lobes of the antenna and the receiver, such as a noise-modulated continuous wave jamming signal, and permits only the wanted reflection signals picked up by the main beam to appear on the indicator.

Radar receivers with a directional beam antenna having side lobes are vulnerable to jamming, that is, the intentional interference of the normal operation of a radar receiver, for example, by the transmission of a signal in the form of a noise-modulated continuous wave which, when picked up by the side lobes of a directional beam antenna, causes an obliteration of the wanted indications on the indicator.

It is an object of this invention to provide a device and method to obviate the effect of such jamming on the radar receivers of a pulse-modulated radar having a directional beam antenna with side lobes.

Other important objects and advantages of this invention will become apparent from the following description.

The obliteration on the indicator of a radar having a directional beam antenna with side lobes is caused by the simultaneous reception of the jamming signal by a side lobe of the directional beam antenna with reception of wanted signals by the main lobe. In fact, if there were no side lobes, the effect of the jamming signal on the indicator would simply be a line in the direction of the jammer having a width corresponding to the width of the main beam, which alone in many cases would not be sufficiently serious to create a problem. However, when lines from the jamming signal also come in on the side lobes, under many conditions the image on the indicator becomes so confused as to be useless. Accordingly, in accordance with my invention, it is recognized that the solution of the problem of eliminating the obliteration on the indicator as a result of jamming is resolved into a problem of preventing signals picked up by the side lobes of the receiving antenna from appearing on the indicator.

As is known in the radar art, in the operation of a pulse-modulated radar of the type referred to, the transmitted signal is sent out as a pulse of short duration and there is thereafter, after the effect on the receiver of the pulse transmission has died away, an elapse of time until the first reflection comes back to the receiver during which no reflections are being received, that is, during which no energy originating from the radar is impinging upon the antenna. For convenience, this interval or time will herein be referred to as the B interval. With a bombsight radar used on an airplane, for example, the B interval of time corresponds to what is known as the "altitude circle" on the indicator. It will be understood, of course, that this B interval will vary in size depending on the distance of the nearest object which returns a reflection. There is also a similar time interval, from the time that all reflections from a given pulse have died down to a negligible value until the beginning of the next pulse that no energy originating from the radar system is being reflected back to the receiver. This interval, for convenience, will be referred to herein as the D interval. Such intervals of time as the B interval and D interval are in general those intervals in which no energy originating from the radar transmission system is impinging upon the antenna, but during which the receiver is in condition to receive signals impinging upon the antenna.

In accordance with an embodiment of my invention, to prevent signals picked up by the side lobes of a receiving antenna from appearing on the indicator, I provide, in addition to the usual pulse-modulated radar equipment, an auxiliary antenna which receives incoming signals, particularly jamming signals, simultaneously with the main antenna. Jamming signals received by both the main antenna and the auxiliary antenna are simultaneously amplified in the main and auxiliary channels, rectified and subtracted. This is done by providing an auxiliary channel comprising a usual mixer connected through a transmit-receive switch to the auxiliary antenna and preferably to the local oscillator of the main channel, an auxiliary intermediate frequency amplifier, an auxiliary detector and by passing the output from the auxiliary detector to a subtractor to which is also fed the output from the main channel. In the subtractor the output from the auxiliary channel is subtracted from the output of the main channel. The output from the subtractor is used to operate an automatic gain control as part of the auxiliary channel circuitry which in turn operates a holding detector for setting the gain of the auxiliary intermediate frequency amplifier so that the output from the subtractor is substantially zero or a negligible minimum, that is, a minimum and sufficient negligible to have no effect on, and not to appear on, the indicator. This circuit comprising automatic gain control and holding detector is synchronized for operation only during such an interval as the D interval by a gate circuit between the automatic gain control and the hold detector. This gating circuit is synchronized with the transmitter to gate the setting of auxiliary intermediate frequency amplifier gain and holding detector so that during the D interval the output from the subtractor is set to be a negligible minimum and by the holding detector is held at this setting until the next setting in the next D interval. This arrangement sets the entire receiver of my invention during the D interval so that any signal particularly including the jamming signal received after this setting in the D interval until the next setting in the next D interval is subtracted out, that is, particularly during the period of time that reflections or ground returns are being received by the receiver. For convenience, this interval will be referred to as the C interval. Also, for convenience, the interval between the D interval and the B interval will be referred to as the A interval. This is the interval during which a pulse is sent out and the effects of the pulse transmission on the receiver have died away. Accordingly, any signal picked up by a side lobe of the antenna during the time of this setting during a D interval will be subtracted out in the subtractor, until the next setting in the next D interval. Only the output from the subtractor is passed through the usual video amplifier and on to the indicator. Hence, the only signals which will appear on the indicator must come in by way of the antenna where the gain is greater than the gain of the particular portion of the side lobe which is subtracted out from one setting to the next. This will be the case for the main beam which has a gain substantially greater than the first side lobes. Accordingly, with the arrangement in accordance with my invention it is possible to eliminate the effect of reception for a jamming signal by the side lobes and at the same time receive signals by way of the main beam.

This will be the case, of course, for reception by the main beam as well as the side lobes of the antenna in the direction of the jamming signal but only in this direction. Accordingly, in the direction of the jamming signal all incoming signals, even including reflection signals and, of course, the jamming signal, will be balanced out when received by the main beam as well as the side lobes. However, with respect to the main beam this will occur only in the direction of the jamming signal and only to the extent of the width of the main beam. However, instead of leaving what might be called a blank line on the indicator in the direction of the jamming signal as might be expected, a line will appear in this direction corresponding to the width of the main beam due to the large increase in noise level in the auxiliary channel, due to the large amplification in the auxiliary channel because of the high gain of the main beam, and resulting from the fact that the noise from the main channel and from the auxiliary channel cannot be subtracted out by the subtractor but, as will be understood for noise, are added. It is important to note, however, that this line will have a width corresponding only to the width of the main beam and, although unfortunate, is not an important disadvantage. The important result of my invention is that reception from the side lobes is eliminated in the same manner, but that the amplification, in the auxiliary channel required to eliminate reception from the side lobe having a substantially lower gain than the main beam is not sufficiently great to cause the noise level to produce undesirable visible indication on the indicator. In order to minimize any such noise resulting from amplification in the auxiliary channel of my invention, it is preferable that the gain of the auxiliary antenna be as close to the gain of the side lobes as is practicable, preferably just a little less than the gain of the first side lobes. It is, however, an exceedingly important advantage of my invention that the reception of the jamming signal by all the side lobes is eliminated from the indicator and reflections received by the main beam are transmitted to the indicator as desired in all parts of the indicator except the line in the direction of the jammer, as pointed out above.

My invention will be more particularly illustrated and explained by the following description of a specific embodiment thereof taken in conjunction with the accompanying drawing in which:

FIG. 1 illustrates schematically a radar having an auxiliary channel, including an auxiliary antenna and auxiliary receiving circuit in addition to the usual main receiving channel in accordance with my invention, using block diagrams for the conventional electrical circuit components.

FIG. 2 shows a schematic plot with time of power transmitted from and received by the antenna of a pulse-modulated radar, particularly illustrating the time intervals A, during which a pulse is transmitted and the effects of such transmission on the receiver have disappeared; B, from the time the effects of the pulse transmission on the receivers are down to zero until the first reflection is received; C, from the time the first reflection is received until the reflections have died away to zero; D, from the time the reflections have died away to zero until the beginning of the next transmitted pulse, and, within interval D, an interval E during which the gating circuit of the auxiliary channel synchronized with the timing circuit of the transmitter opens the auxiliary circuit for adjustment and setting.

Referring now more particularly to FIG. 1 of the drawing at 1 is schematically illustrated a main directional beam antenna having the customary $csc^2$ radiation pattern in vertical section (not whosh on the drawing) and the pattern shown generally at 2 in horizontal section with main beam 3, and side lobes 4, 4', 5, 5', 6, 6', 7, 7'. The main beam and side lobes in horizontal section are illustrated schematically only, and it will be understood that the width of the main beam will be smaller than shown, for example, 2.8°. The antenna is connected to a transmit-receive switch 10 which in turn has leads to the transmitter 8, having usual modulator 36, and synchronizer 37, (which may be a portion of the modulator), and to the mixer 9 of the receiver, as is usual for this type of radar. Connected to the mixer 9 by lines 11 and 12 is a local oscillator 13 as is also customary. The main channel of the usual receiver also includes an intermediate frequency amplifier 14 and detector 15. Also as part of a usual receiver there is a video amplifier 16 and indicator 17, which may be, for example, a PPI scope. It should be noted, however, that in accordance with this particular embodiment of my invention the detector 15, instead of being connected directly to the video amplifier as usual, is connected by line 18 to a subtractor 19 so that the output from detector 15 is fed to subtractor 19, and only output from subtractor 19 is passed by way of line 20 to the video amplifier 16 and then on to the indicator 17 in any usual manner.

At 21 is indicated schematically an auxiliary receiving antenna having a radiation pattern in horizontal section substantially non-directional as indicated by the circle at 22. Preferably this auxiliary receiving antenna 21 will have a broad directional vertical pattern beam adapted to cover the same volume scanned by the main beam and its side lobes which might pick up a jamming signal. This may be, for example, a beacon type antenna having a diameter and depth of 3 or 4 inches. Auxiliary receiving antenna 21 is connected to an auxiliary receiving channel including auxiliary transmit-receive switch 40, auxiliary mixer 23, auxiliary intermediate frequency amplifier 24 and auxiliary detector 25. This switch 40 is the same kind as transmit-receive switch 10 and is operated and controlled in the same manner as switch 10, except that switch 40 is connected to the output of transmitter 8 by lead 48 to which is applied only enough power to operate switch 40 but not enough to cause pulses to be sent out from auxiliary antenna 21. Auxiliary mixer 23 is provided with a local oscillator signal by connecting to the output of local oscillator 13 by way of lines 11 and 26. This makes it possible to maintain the frequency output of mixer 9 and auxiliary mixer 23 substantially equal. The output from auxiliary detector 25 is fed by way of line 27 to subtractor 18. In subtractor 19 the output from the auxiliary channel fed to the subtractor by way of line 27 is subtracted from the output of the main channel fed by way of line 18 so that the output from the subtractor in line 20 is the result of subtracting the output in line 27 from the output from line 18. This may be done by connecting the outputs from lines 18 and 27 and transmitting the difference. Hence, the output from the subtractor 19, which is passed to the video amplifier 16 and indicator 17 by way of line 20 is the result of the subtraction of the output from the auxiliary channel from the output of the main channel.

Further, in accordance with my invention the output of subtractor 19 is automatically adjusted to a negligible minimum at a small time interval during which no radiant energy originating from the radar is impinging upon the main antenna, such as, for example, during the D interval referred to above. This is accomplished by means of an additional circuit connected from the output lead 20 of the subtractor 19 to the auxiliary intermediate frequency amplifier 24. Thus, connected to line 20 is line 28 which passes the output of the subtractor 19 through automatic gain control amplifier 29, (which may be a simple amplifier), line 30, gating circuit 31, line 32, holding detector 33, and line 34 to auxiliary intermediate frequency amplifier 24. When this circuit is closed by gating circuit 31 in series therein, as will be described below, the automatic gain control 29 adjusts or sets the gain so that the output of subtractor 19 is a negligible minimum by adjusting or setting the amplification in auxiliary i-f amplifier 24, in a manner usual in the electronics art, and the holding detector 34 clamps or holds this adjustment or setting, as is also customary in the electronics art, during the time the gating circuit 31 is open, as will be described below.

Gating circuit 31 is closed and opened by means of a lead 35 from the synchronizer 37 associated with transmitter 8. As will be understood by those skilled in the radar art and particularly with respect to pulse-modulated radar, pulses are sent out by the transmitter at regular intervals. The switching of the transmit-receive switch 10 and the timing of the electron beam sweep of the indicator 17 and synchronized and controlled by the synchronizer 37 which may form a portion of the modulator 36 associated with transmitter 8. A further discussion of such a synchronizer will be found in "Radar System Engineering" edited by Ridenour, pages 518 to 524. Gating circuit 31, connected to synchronizer 37 by line 35, is so controlled by the synchronizer that the gating circuit closed only for a short period of time during interval D. This may be done by means of a delayed pulse developed by the synchronizer 37, as taught by the previous reference. It will be noted that only unwanted signals such as a jamming signal will be picked up by both the main antenna and the auxiliary antenna during this short period of time, hereafter referred to as the setting interval, so that during this setting interval the device of my invention is set so that the output of the subtractor 19 is a negligible minimum so the unwanted signals are subtracted out. This setting is held by the holding detector so that after the gating circuit is opened the unwanted signals are still subtracted to zero. With this setting of my device for the highest gain of a side lobe, for example, wanted reflections picked up by the main beam will, of course, also be picked up by the auxiliary antenna and, to the extent of the relative gain of the auxiliary antenna and auxiliary channel with respect to the gain of the main beam and main channel, will be subtracted, but to the extent that the gain of the main beam is greater than the gain of the particular side lobe being subtracted out, the wanted signals will be passed through the subtractor, video amplifier and to the indicator. It should be noted that this reception and indication takes place during interval C when gating circuit 31 is open so that during interval C the output from subtractor 19 has no effect on the setting of auxiliary i-f amplifier 24.

An an example of the operation of my device, let it be assumed that the rotating csc$^2$ antenna 1 is transmitting and receiving pulses and reflections as illustrated in FIG. 2. As indicated in FIG. 2, time is plotted from left to right and power of pulses transmitted and reflections received is plotted, but not to scale, from the base line 50 upwardly, at 51, 52, and 53 are shown three of the regularly spaced transmitted pulses. At 54 and 55 are illustrated reflections returned from pulses 51 and 52 respectively. Underneath the plot the period from pulse to pulse is shown divided into time intervals A, B, C and D. Interval A starts with the beginning of the transmission of each pulse and includes the time during which the pulse is transmitted and in addition a sufficient time for the effects of pulse transmission on the radar to die away. Interval B begins at the end of A and includes the period of time up to the instant the first reflection of a pulse is returned to the antenna. Interval C covers the time the first reflection is returned to the antenna until distant reflections have fallen to zero or negligible value. Interval D covers the period from the end of C to the beginning of A when the next pulse begins. It will be understood by those skilled in the radar art that FIG. 2 represents the situation for a typical pulse-modulated radar.

The group of lines 36 on FIG. 1 represents oncoming wavefronts from a noise-modulated jammer striking auxiliary antenna 21 at the instant that rotating antenna 1 has its first side lobe 4 pointed directly toward the direction of approach of these waves as indicated by arrow 39. The jamming signal is simultaneously picked up by side lobe 4 of antenna 1 and auxiliary antenna 21. The signal from antenna 1 is received in the main channel and fed to subtractor 19 by line 18 and simultaneously the signal from auxiliary antenna 22 is received in the auxiliary channel and fed to subtractor 19 by way of line 27. Subtractor 19 subtracts the input thereto entering line 27 from the input thereto entering line 18 and the result of this subtraction is passed out by way of line 20.

In accordance with my invention, at the setting interval E, which is a small part of interval D, as shown in FIG. 2, an impulse from the synchronizer 37 associated with the transmitter 8 passes through line 35 and operates gating circuit 31, which may be a simple tube circuit acting as a gate. During the time interval E when gating circuit 31 is closed, the output from the subtractor 19 is applied to the automatic gain control amplifier 29 which acts to automatically adjust or set the gain of auxiliary i-f amplifier 24 by controlling its bias so that the output of subtractor 19 is a negligible minimum, i.e., the output signal from the subtractor 19 is zero or substantially so. Also during interval E at the time automatic gain control 29 sets auxiliary i-f amplifier 24 so the output from subtractor 19 is a negligible minimum, holding detector 33 holds or clamps this setting of auxiliary i-f amplifier 24 so that it is clamped when gating circuit 31 is opened at the end of interval E. This arrangement subtracts out the reception of the jamming signal so that during the ensuing intervals, A, B, and C and until the beginning of the next E interval, the reception by the peak of side lobe 4 and auxiliary antenna 22 are balanced out, so during interval C, when reflection signals are received by the main beam, nothing appears on the indicator received by side lobe 4 and the reception of the jamming signal by side lobe 4 is eliminated. The gain of the main beam, however, is substantially greater than the gain of the side lobe 4, and accordingly, reflections received during interval C will appear on the indicator as desired, even though these reflections are received by both the main and auxiliary channels, because the gain of the main beam 3 is substantially greater than the gain of the peak of side lobe 4. It is to be understood that, in effect, it is the gain of the side lobe 4 that is balanced out.

It should be noted that the rate of rotation of the main antenna 1 in scanning is such that the angular displacement of side lobe 4 from interval E to the end of interval C is sufficiently small to be negligible. For example, a typical pulse-modulated radar may have a pulse frequency of 800 pulses per second and the antenna may rotate at 90° per second. The angular displacement from pulse to pulse would then be only about 0.1° and the effect of such a small angular displacement on the system of my invention would be negligible.

It will be understood that the device in accordance with my invention is set at every interval E to balance out the reception coming in during the interval E, when no reflections are being received, and so, when a noise-modulated jamming signal is impinging on the antenna 1, reception from the direction of the jamming will be balanced out. As antenna 1 rotates from right to left, as indicated by arrow 38, reception of the jamming signal will be balanced out for lobe 4, lobe 5, lobe 6, lobe 7, lobe 7′, lobe 6′, lobe 5′, lobe 4′ and main beam 3 in order with the rotation of the antenna and as these respective lobes of the radiation pattern are pointed in the direction of the oncoming jamming signal as shown by arrow 37.

The foregoing describes my invention in its preferred aspects, and illustrates my invention by way of specific embodiments and specific examples, but alterations and modifications may be made thereof without departing from the invention herein disclosed and claimed.

Having described my invention:
I claim:

1. In a pulse-modulated radar having a directional beam antenna with main beam and side lobes, a transmitter, a receiver, a transmit-receive switch for switching said antenna alternately to said transmitter and to the receiver, the receiver comprising a mixer with associated local oscillator, intermediate frequency amplifier, detector, video amplifier and indicator, the improvement for eliminating the undesirable effect on the indicator of reception by the side lobes of a jamming signal which comprises an auxiliary antenna operatively connected to an auxiliary transmit-receive switch operated by signal from said transmitter and connected to an auxiliary receiving channel adapted to receive signals of the same frequency as those received by said receiver, and comprising an auxiliary mixer connected to said local oscillator, an auxiliary intermediate amplifier, and an auxiliary detector; a subtractor connected to the output of said detector and to the output of said auxiliary detector for subtracting the output of said auxiliary detector from the output of said detector; means for passing the output from said subtractor to the video amplifier and on to the indicator; circuit means for setting the gain of said auxiliary intermediate frequency amplifier so that output from said auxiliary detector substantially equals the output from said detector and the output from said subtractor is negligible, said means including a gating circuit closed by the synchronizer of said transmitter during an interval in which no energy originating from the radar transmission system is impinging upon the antenna but during which the receiver is in condition to receive signals impinging upon the antenna so that the jamming signal does not appear on the indicator of the radar; and means for maintaining such setting of said auxiliary intermediate amplifier during the subsequent interval during which reflections from the transmitted pulse are received by the main beam of the antenna and appear on the indicator.

2. A system for reducing the effect of unwanted signals directed toward a receiver intended to receive reflected pulsed signals through an antenna having a radiation pattern that includes a desired main lobe and undesired additional areas, which includes: a primary receiver and antenna adapted to receive said reflected pulsed signals from predetermined directions, said primary receiver including an amplifier; an omni-directional auxiliary receiver and antenna adapted to receive signals of the same frequency as that of said reflected pulsed signals, said auxiliary receiver including an amplifier; means connected to said primary and said auxiliary receivers and effective to combine the outputs thereof in opposition to cancel at least the major portion of one of said signals; sampling means connected to said combining means and measuring said combined output signal at a time when no reflected pulsed signal is being received; means connected to said sampling means and to at least one of said amplifiers, and acting to control the relative magnitude of the outputs of said primary and auxiliary receivers to reduce the output of said combining means to a minimum; and clamping means connected to said amplification controlling means to maintain the action of said controlling means constant between sampling periods.

3. A system for reducing the effect of unwanted signals directed toward an installation comprising a transmitter adapted to transmit pulsed signals and a primary receiver adapted to receive reflections of said pulsed signals, which includes: a primary antenna having a radiation pattern including a desired main lobe and undesired additional areas; a transmitter connected to said primary antenna and adapted to cause the transmission of pulsed signals therefrom; timing means connected to said transmitter and controlling said transmission of said pulsed signals; a primary receiver connected to said primary antenna and effective to receive the reflections of said pulsed signals; an omni-directional auxiliary antenna; an auxiliary receiver connected to said auxiliary antenna and adapted to receive signals of the same frequency as that of said reflected signals, said auxiliary receiver including a variable gain amplifier; means connected to said primary and said auxiliary receivers and effective to combine the outputs thereof in opposition to cancel at least the major portion of one of said signals; sampling means connected to said combining means and to said timing means, measuring said combined output signals at a time when said reflected pulsed signals are not being received and said pulsed signals are not being transmitted; means connected to said sampling means and to said amplifier of said auxiliary receiver, and acting to control the gain of said amplifier to reduce the output of said combining means to a minimum; and display means connected to said combining means and effective to display said output thereof.

4. A system for reducing the effect of unwanted signals directed toward a receiver intended to receive reflected pulsed signals through an antenna having a radiation pattern that includes a desired main lobe and undesired additional areas, which includes; means for receiving said reflected pulsed signals; other means for receiving said unwanted signals; means for combining the outputs of both said receiving means in opposition; means periodically adjusting the output of one of said receiving means relative to the other to provide a minimum output of said combining means; and means holding constant the adjustment of said adjusting means between said periodic adjustments.

* * * * *

UNITED STATES PATENT AND TRADEMARK OFFICE
CERTIFICATE OF CORRECTION

PATENT NO. : 4,010,469
DATED : March 1, 1977
INVENTOR(S) : Jess I. Marcum

It is certified that error appears in the above-identified patent and that said Letters Patent are hereby corrected as shown below:

Column 1, line 9, after "and" insert --which--;

Column 1, line 54, "or" should be --of--;

Column 4, line 6, "whosh" should be --shown--;

Column 4, line 57, "18" should be --19--;

Column 5, line 32, after "17" delete "and" and insert --are--.

Signed and Sealed this twenty-third Day of August 1977

[SEAL]

Attest:

RUTH C. MASON
*Attesting Officer*

C. MARSHALL DANN
*Commissioner of Patents and Trademarks*